UNITED STATES PATENT OFFICE.

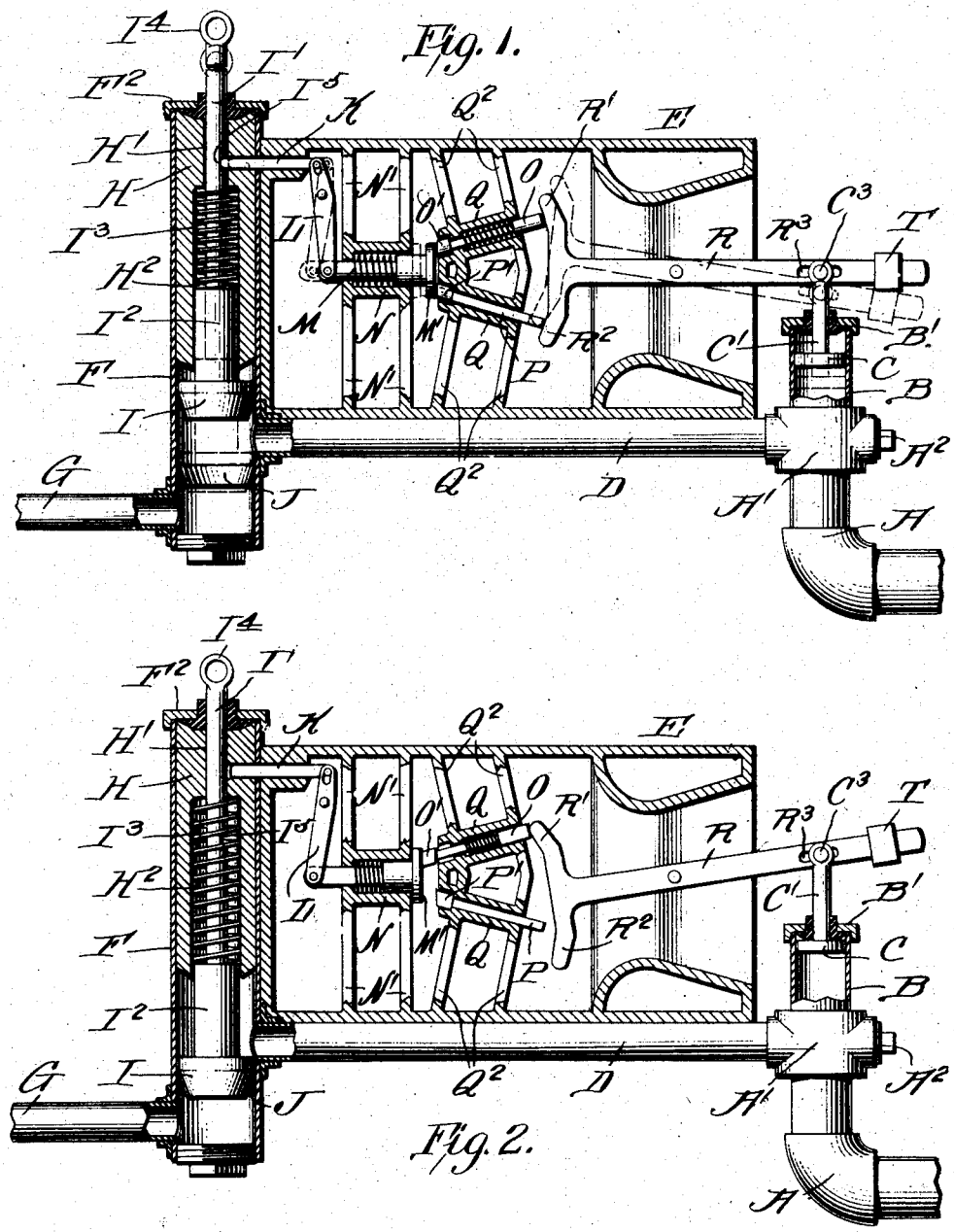

GILBERT WALTER BOWMAN, OF CUMBERLAND, MARYLAND, ASSIGNOR OF ONE-THIRD TO GEORGE EDWARD GRAY, ONE-SIXTH TO CHARLES HENRY SANDERS, AND ONE-SIXTH TO NATHAN WILLIAM DANFORTH, ALL OF CUMBERLAND, MARYLAND.

AUTOMATIC SAFETY GAS-VALVE.

No. 907,103.  Specification of Letters Patent.  Patented Dec. 15, 1908.

Application filed January 22, 1907. Serial No. 353,512.

*To all whom it may concern:*

Be it known that I, GILBERT WALTER BOWMAN, a citizen of the United States, residing at Cumberland, in the county of Allegany and State of Maryland, have invented a new and useful Improvement in Automatic Safety Gas-Valves, of which the following is a specification.

This invention relates to gas valves and more particularly to automatic safety gas valves, the object being to provide a valve which will prevent the gas from escaping in case the pressure leaves the main and returns without being noticed.

Another object of my invention is to provide a valve that will automatically close from an over pressure of gas so as to prevent the meter from exploding.

Another object of my invention is to provide an automatic valve that will remain open under an ordinary pressure, but will close if the pressure becomes too great to be dangerous, or if the pressure gets low enough to put out the blaze.

With these and other objects in view, the invention consists in the novel features of construction, combination and arrangement of parts, hereinafter fully described and pointed out in the claims.

In the drawings forming a part of this specification: Figure 1 is a longitudinal sectional view through my improved gas valve showing the same opened. Fig. 2 is a longitudinal sectional view of the valve showing it closed by the pressure becoming too great.

In the drawing A indicates a supply pipe on the ends of which is secured a four-way joint A' having a valve casing B, secured in the upper port provided with a cap B' having a central opening in which is arranged a rubber washer through which works the stem C' of a valve C, for the purpose hereinafter fully described.

A plug A² is secured in one of the horizontal ports of the joint A' and in the opposite port the end of a pipe D is secured, on which is mounted a housing E carrying a delivery valve casing F, at one end, which is of a greater length than the height of the housing and to the lower end of which is connected the end of the pipe D. An outlet pipe G is connected to the opposite side of the casing adjacent its end which is adapted to be connected to the meter in the ordinary manner.

The lower end of the casing F is closed by a plug so that it can be readily cleaned when desired. Secured in the upper portion of the casing is a plug H provided with a vertical bore H' which is enlarged as shown at H², in which is mounted the enlarged portion I² of a valve stem I' which is provided with a valve I at its lower end adapted to be seated in a valve seat J secured in the casing F, under the pipe D, so as to prevent the gas from passing out of the pipe G. The stem I' is surrounded by a coil spring I³ between the enlarged end and shoulder formed by the bore, and extends upwardly through the bore H' out through a rubber washer secured in a central opening in a cap F² secured on the upper end of the casing F and is provided with an eye I⁴ in its ends to which a chain or cable can be connected, so as to lift the valve when desired.

A notch I⁵ is formed in the stem I in which the end of a pin K is adapted to fit and hold the valve up against the tension of the spring. The pin is slidably mounted in a transverse bore which extends through the plug casing, and housing, and is loosely connected to the short arm of a lever L, which is pivotally mounted in the housing, the long arm of which is connected to the end of a spring actuated-plunger M, mounted in a casing N supported in the housing by ribs N'. The plunger M is provided with a head M' adapted to be engaged by the angled ends of the heads O', P' of pins O and P, which are mounted in the converging casings Q, Q', supported in the housing by ribs Q². The pin O is surrounded by a coil-spring for returning the same after it has been pressed downwardly, and the pin P will return by gravity as will be hereinafter fully described.

A lever R is pivotally mounted in the opened end of the housing E provided with oppositely disposed arms R', R² at one end adapted to engage the pins O, and P and force the pin out of the valve stem and allow the spring to force the valve down into the seat, and close the same. The lever projects out of the end of the housing and is provided with a slot R³ in which is mounted a pin C³, secured in the eye formed in the end of the valve stem C' so that when the valve C moves up or down, in the pipe, the lever will be rocked so as to throw either one of the arms R', R² into engagement with the pin O or P, which will engage the plunger head M', and draw the pin out of the notch in the valve stem I'. A weight T is mounted on the end of the lever R so that the valve can be set so as to operate it at any pressure desired.

The operation is as follows: The valve C being adjusted to the amount of pressure in the supply pipe which will hold the valve in the normal position as shown in Fig. 1, the gas passing through the pipe D and casing F and out the outlet pipe G. If the pressure is increased or decreased the valve C will be raised or lowered as the case may be, which will operate the lever and through the medium of the pin and lever, the pin K will be drawn out of the notch in the valve stem I', and allow the valve to be forced down into the seat J, and out of the outlet.

Having thus fully described my invention, what I claim as new and desire to secure by Letters Patent is:—

1. In a device of the kind described, the combination with a spring actuated cut off valve, of a plunger carrying tripping means adapted to engage said valve, pins normally engaging said plunger and a rocker lever provided with arms adapted to engage said pins.

2. In a device of the kind described, the combination with a spring actuated cut off valve, of a slidably mounted locking pin adapted to engage said valve, a lever connected to said pin, a plunger connected to said lever, slidably mounted pins normally engaging said plunger, and a rocker lever provided with arms adapted to engage said pins, for the purpose described.

3. In a device of the kind described, the combination with a delivery valve casing, of a spring actuated valve mounted in said casing, a supply valve casing connected to said delivery casing, a regulating valve mounted in said casing, a slidably mounted locking pin adapted to engage said delivery valve, tripping means connected to said pin, and a lever connected to said regulating valve, adapted to engage said tripping means, for the purpose described.

4. In a device of the kind described, the combination with a spring actuated cut off valve, a locking pin adapted to engage said valve, a lever connected to said pin, a spring actuated plunger connected to said lever slidably mounted pins normally held into engagement with said plunger, a working lever provided with arms adapted to engage said pins, and a regulating valve, connected to said lever.

GILBERT WALTER BOWMAN.

Witnesses:
  GEO. E. GRAY,
  CHARLEY H. SANDERS.